Feb. 4, 1941.  W. L. FORTER  2,230,434
VALVE
Filed Feb. 15, 1939  2 Sheets-Sheet 1
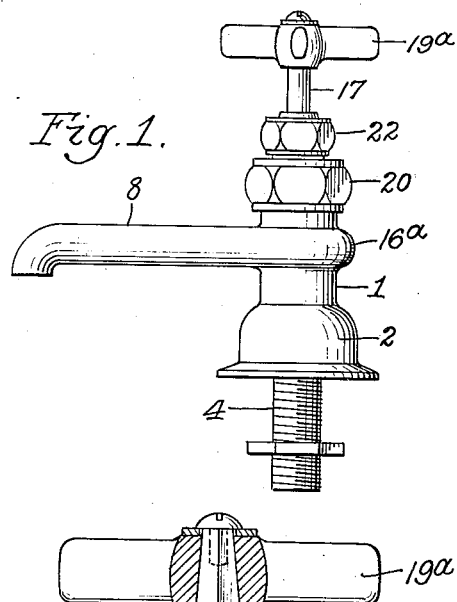
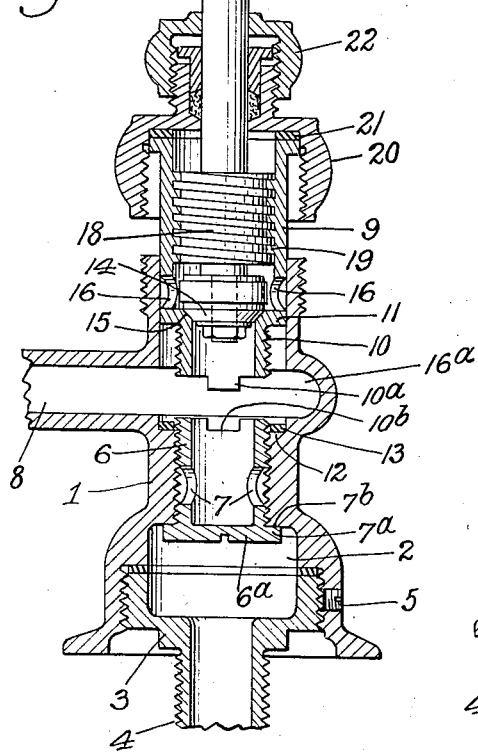
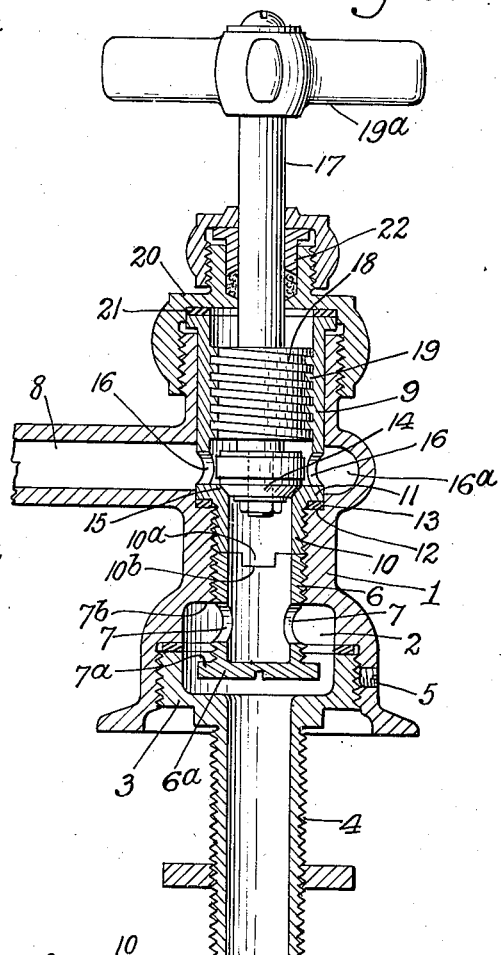
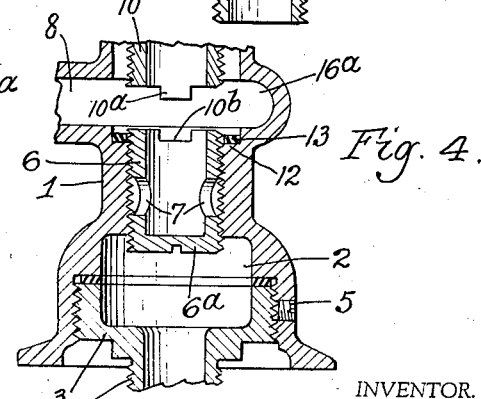
INVENTOR.
*William L. Porter*.
BY *Parker & Carter*
ATTORNEY.

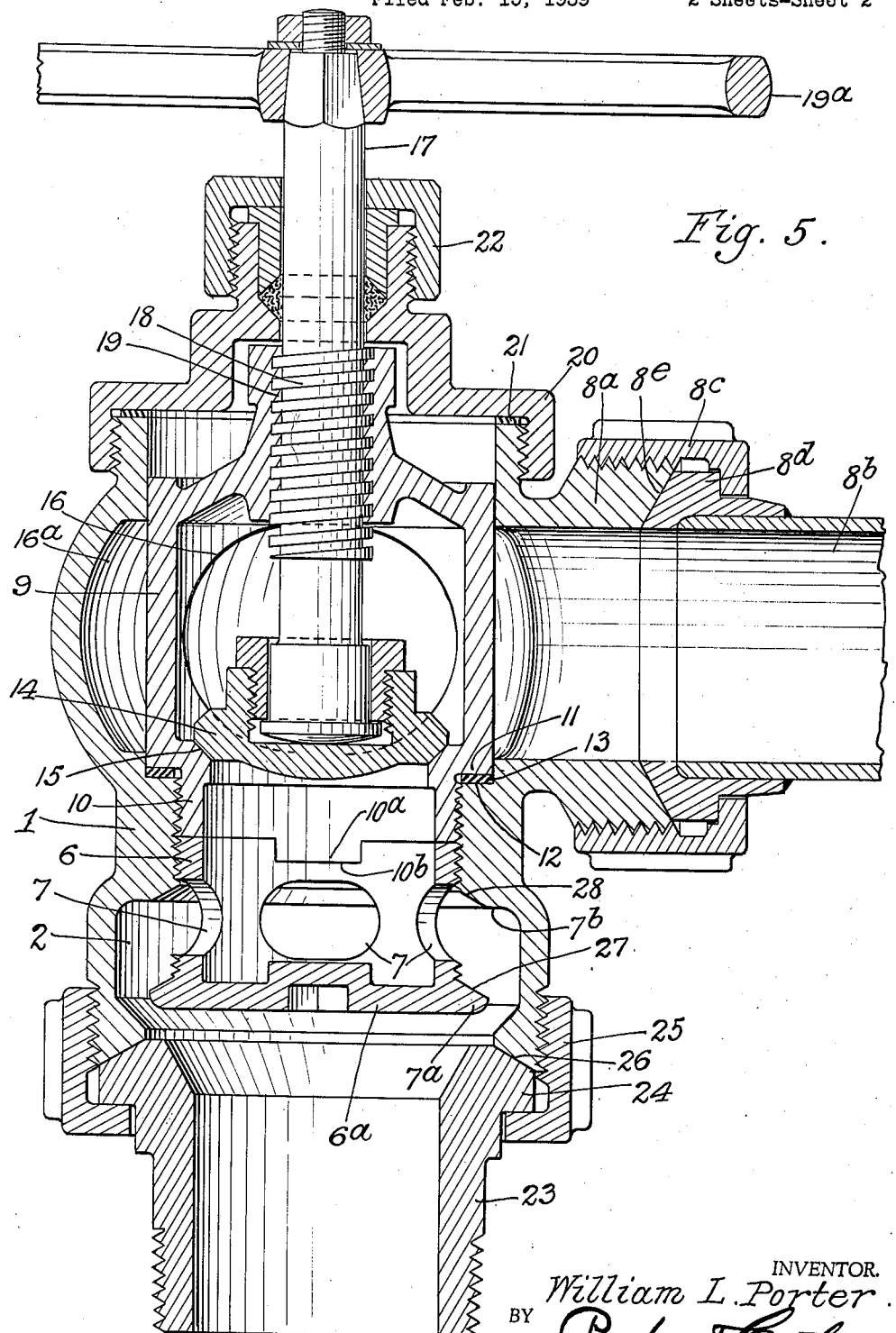

Patented Feb. 4, 1941

2,230,434

UNITED STATES PATENT OFFICE 2,230,434

VALVE

William L. Porter, Chicago, Ill.

Application February 15, 1939, Serial No. 256,540

6 Claims. (Cl. 277—33)

This invention relates to improvements in valves and has for its object to provide a new and improved device of this description.

The invention has as a further object to provide a valve simple in construction, efficient in operation and which can be easily and quickly repaired or replaced. The weakest portion of a valve consists of the opening and closing parts or device, as there is often provided non-metallic material where the two members of the opening and closing device meet, necessitating repairs and replacements. The invention has as a further object to provide a valve wherein the removal of the opening and closing members for repair or replacement shuts off the flow of fluid through the valve.

The invention has other objects which are more particularly pointed out in the accompanying description.

Referring now to the drawings,

Fig. 1 is a view of one form of valve embodying the invention;

Fig. 2 is a vertical section through the valve illustrated in Fig. 1, showing the parts in their operative position;

Fig. 3 is a view similar to Fig. 2, showing the parts where the fluid is shut off and where the opening and closing members may be then easily removed;

Fig. 4 is a view showing the shut off member without the laterally extending part; and Fig. 5 is a sectional view through a valve for high pressure fluids, such as steam.

Like numerals refer to like parts throughout the several figures.

Referring now to the drawings, I have shown one form of valve embodying the invention. It is of course evident that the invention may be used in any forms where it is applicable. In the construction herein shown, there is provided a casing 1. This casing is provided with a recess 2. There is a member 3, which is arranged to be connected with the source of fluid supply by means of the member 4 and with which the casing 1 is connected in any desired manner when the device is in use. In Figs 1 and 2 the casing 1 is fastened to the member 3 by means of a set screw 5. A shut off member 6 has a screwthreaded engagement with the interior of the casing 1. This shut off member is provided with one or more openings 7 through which the fluid may pass so as to pass up into the interior of the casing 1 and thence out the discharge member 3 of the valve when the closing member is opened. The shut off member may be provided with a shut off engaging portion 7a, which engages a shoulder 7b on the casing 1, so that when the parts 7a and 7b are in contact, the fluid is shut off so as to prevent it from entering the casing above the shoulder 7b. The end of the shut off member has a wall 6a extending thereacross which completely closes the end. This wall preferably has a suitable notch for a tool which may be used for turning it.

In Fig. 4 I have shown a construction where the laterally extending portion 7a is omitted. In this construction the tight fit produced by the screwthreads on the shut off device and casing prevents the leakage of the fluid. In this form the shut off device can be inserted into the casing from the same end as the valve seating member. The laterally projecting part 7a has two advantages, one is it prevents the shut off device from being moved too far upwardly, and it also makes a more fluid tight joint between the parts.

Within the casing 1 is a valve seating member which has two portions of different diameters, one an upper portion 9 of a larger diameter and another a lower portion 10 of a smaller diameter. This seating member has a shoulder 11 which engages a shoulder 12 on the casing. There is preferably a packing member 13 between these shoulders when the parts are in their operative position. The portion 10 of the seating member and the shut off member have interlocking parts which may be any desired shape. As herein shown, the seating member is provided with one or more projections 10a and the shut off member with one or more notches 10b, the projections fitting into the notches when the parts are in their operative position, as shown in Fig. 2.

Within the seating member is an opening or closing member consisting of the valve member 14, arranged to be moved into and out of contact with a seat 15 on the seating member. Just beyond this seat, the seating member is provided with one or more openings 16 through which fluid passes so as to be discharged from the casing. The casing is preferably provided with a chamber 16a surrounding these openings, so as to facilitate the escape of the fluid.

The valve member 14 is connected to a valve stem 17 which is provided with a screwthread 18 engaging screwthreads 19 on the interior of the seating member, and a handle 19a so that it may be easily turned. A retaining member 20 fits over the end of the casing 1 and has a screwthreaded connection therewith. There is preferably a packing 21 between the retaining member 20 and the end of the enlarged portion 9 of the seating member. There is a packing gland 22 for the stem 17.

In Fig. 5 I have shown a valve particularly adapted for use with high pressure fluids, such as high pressure steam as used in locomotives. In this construction the parts are substantially the same as those shown in Figs. 1, 2 and 3 and I have applied to them the same reference numerals. There is a change at one end of the valve, for example, wherein the pipe 23, which connects with the source of fluid or steam supply, is provided with an annulus 24 and is connected to the casing of the valve by the coupling member 25. The engaging face of this pipe and the casing are preferably beveled as shown at 26. The laterally projecting portion 7a on the shut off member is also preferably provided with an inclined or beveled face 27 and the shoulder 7b is provided with an inclined face 28. These inclined faces provide tighter connections between the parts.

The discharge member 8a in this construction is provided with external threads and is connected to a pipe 8b by the coupling member 8c which engages an annulus 8d on the pipe 8b. The discharge member 8a and the pipe 8b have inclined faces at the point where they contact, as shown at 8e. This insures a tighter connection of the parts. In the construction shown in Fig. 5, the openings 16 in the seat-member are of sufficient size to permit the valve part 14 to be inserted and attached to the stem before the seating member is placed in the casing. By means of the construction herein shown, a very strong and durable valve is provided which will withstand high pressures and rough usage.

The use and operation of my invention are as follows.

When the valve is assembled, the shut off member 6 is placed in the lower end of the casing 1 and turned until its upper end projects into the chamber 16a. The valve seating member is then inserted in the upper end of the casing and the projections 10a fitted into the notches 10b. The seating member is then rotated and this rotation causes it and the shut off member 6 to be moved downwardly to the position shown in Fig. 2. The valve member 14 and stem 17 are then placed in position and the retaining member 20 and the packing gland 22 are then placed in position. The valve member 14 is ordinarily in contact with the seat 15. When it is desired to let the water escape, the handle 19a is turned so as to move the valve member 14 from contact with the seat 15, whereupon the water flows through the openings 7 and 16 and out the discharge 8.

When it is desired to remove or repair the seating members, the retaining member 20 is removed and the seating member is rotated in the unscrewing direction. This moves it up and also moves the shut off member 6 upward until the portion 7a of the shut off member engages the shoulder 7b of the casing. This shuts off the flow of water into the casing. When this position of the shut off member is reached, the interlocking parts 10a and 10b are in the chamber 16a. The part 10 of the seating member will then be free from the screwthreads and the entire seating member and valve member 14 may then be moved out of the casing, the flow of liquid being completely shut off by the shut off member 6.

When the seating members are repaired or new ones provided, the seating member is then inserted in the casing until the interlocking parts 10a and 10b are brought into contact. The seating member is then rotated, the part 10a engaging the screwthreads in the casing, and the shut off member is moved down to open communication between the openings 7 and the recess 2, so that fluid may flow through the openings 7 up into the lower part of the seating member. When this is accomplished, the valve member 14 is on its seat and the parts are in the position shown in Fig. 2. It will thus be seen that the seating members of the valve may be easily and quickly removed for repair or replacement and that the act of removing them moves the parts so that communication between the discharge 8 and the source of fluid supply is closed, thereby shutting off the escape of fluid. It will also be noted that the mere act of putting the parts back in position opens up communication to the source of fluid supply, so that by moving the valve member 14 from its seat, the fluid will escape through the discharge 8. This construction therefore provides a cheap, efficient valve which can be easily and quickly repaired and the party who repairs it need give no consideration to the question of the fluid, as the valve automatically takes care of this and shuts off communication with the fluid supply while the parts are being examined and repaired, and opens up communication with the fluid supply when the parts are placed in position.

In Fig. 5 I have shown a construction particularly adapted for use with high pressure fluids, such as steam. The construction shown in this figure is made so that it can be substituted on locomotives for the valves now used and with this construction, the valve members, including the seating member, can be easily and quickly removed, their removal completely shutting off the high pressure steam. They can then be repaired or replaced and when replaced, the shut off device is moved to its open position.

It will thus be seen that with this construction there is complete and positive automatic movement of the shut off device to its closed position and to its open position by simply removing and inserting the seating member.

I claim:

1. A valve comprising a casing having an inlet at one end and a laterally extending discharge outlet, a shut off member at one end of the casing having a threaded part making a threaded connection with the interior of the casing, a seating member on the interior of the casing, having two parts of different diameters, one smaller than the other, the smaller part having a threaded connection with the interior of the casing, said smaller part having the same exterior diameter as the threaded part of the shut off member, interlocking parts on the shut off member and the threaded part of the seating member, the rotation of the seating member in a direction to remove it from the casing, moving the shut off member to its shut off position and disconnecting the screwthreaded part of the seating member from the casing, so that the seating member may be disconnected from the shut off member and moved out of the casing, said seating member provided with a lateral opening which communicate with said discharge outlet when the parts are in their normal position.

2. A valve comprising a casing having a recess in one end and with a discharge outlet at one side thereof, a threaded opening in the casing communicating with said recess, a shut off member having a threaded engagement with the threads in the casing and provided with a laterally extending engaging portion, means below said shut off member for connecting said recess with a source of fluid supply, an opening in the shut off member located between said laterally extending engaging portion and the portion which is threaded to the casing and normally communicating with said recess when the device is in operation, a seating member in the casing having two members of different diameters, one smaller than the other, the exterior of the larger member being free from threads, the smaller member having threads which engage threads on the interior of the casing and being of substantially the same diameter as the shut off member, said seating member and shut off member having interlocking parts, the seating member having an opening therein communicating with the interior of the seating member through which fluid may flow to said discharge outlet, a valve member in the seating member, a seat therefor, a stem for said valve member, and a retaining member surrounding said stem and engaging said casing, which closes the end of the casing to prevent removal of the seating member.

3. A valve comprising a casing having a discharge outlet at one side thereof, a seating member in the casing having two parts of different diameters, the part of smaller diameter having exterior screwthreads and the part of larger diameter having a smooth outer face, said seating member having a shoulder intermediate its ends, a shoulder on the casing engaged by the shoulder on the seating member, the seating member having a part normally opposite said discharge outlet and which has an opening through which fluid passes to the discharge outlet, a valve member in the enlarged portion of the seating member, a seat in the seating member which said valve member engages when the valve is closed, and a shut off member having a threaded engagement with the interior of the casing, the shut off member and the portion of smaller diameter of the seating member having interlocking parts, arranged so that when the seating member is rotated to remove it from the casing, it rotates the shut off member and moves it to its shut off position.

4. A valve comprising a casing having a discharge outlet at one side thereof, a removable seating member in the casing having a portion thereof normally opposite said discharge outlet and which has an opening through which fluid passes to the discharge outlet and a screwthreaded connection with the interior of the casing below said opening for a portion of its length, a hollow shut off member having a screwthreaded connection with the interior of the casing, enclosed at one end, but having an opening leading to the interior thereof intermediate its ends, an interlocking connection between the seating member and the shut off member, and a valve member in the seating member, the rotation of the seating member to remove it form the casing automatically and positively moving the shut off member to its shut off position and means for attaching to said casing below said seating member, a pipe leading to a source of fluid supply.

5. A valve comprising a casing having a discharge outlet at one side thereof, a removable seating member in the casing having a screwthreaded connection with the interior of the casing for a portion of its length, said casing being provided with a recess near its lower end, a hollow shut off member having a screwthreaded connection with the casing, enclosed at one end, but having an opening leading to the interior thereof intermediate its ends, the lower end of said shut off member normally projecting into said recess, the opening therein communicating with said recess, an interlocking connection between the seating member and the shut off member, and a valve member in the seating member, the rotation of the seating member to remove it from the casing automatically and positively moving the shut off member to its shut off position, said shut off member having a laterally extending portion which engages the casing when the shut off member reaches its shut off position, so as to positively stop the movement of the shut off member when the threaded portion of the seating member has become disengaged from the threads in the casing, said seating member having a portion opposite said discharge outlet which has an opening therein through which fluid passes to the discharge outlet.

6. A valve comprising a casing having a discharge outlet at one side thereof, a removable seating member in the casing having a portion thereof opposite said discharge outlet with an opening therein through which fluid passes to the discharge outlet, said seating member having a threaded portion which has a screwthreaded connection with the interior of the casing, a hollow shut off member having a portion of substantially the same diameter as the threaded portion of the seating member and which has a screwthreaded connection with the casing, said shut off member being enclosed at one end, but having an opening leading to the interior thereof intermediate its ends, an interlocking connection between the seating member and the shut off member, and a valve member in the seating member, the rotation of the seating member to remove it from the casing automatically and positively moving the shut off member to its shut off position, said shut off member having a laterally extending portion which engages the casing when the shut off member reaches its shut off position, so as to positively stop the movement of the shut off member when it has been moved far enough into the casing to release the seating member, said laterally extending portion acting also as an additional closure between the shut off member and the casing.

WILLIAM L. PORTER.